Oct. 30, 1956

T. W. KALBOW ET AL 2,768,595

ROTATABLE DEVICE FOR COOLING A PART
DURING A BRAZING OPERATION

Filed June 4, 1953

INVENTORS
T. W. KALBOW
L. O. REICHELT

BY C. B. Hamilton
ATTORNEY

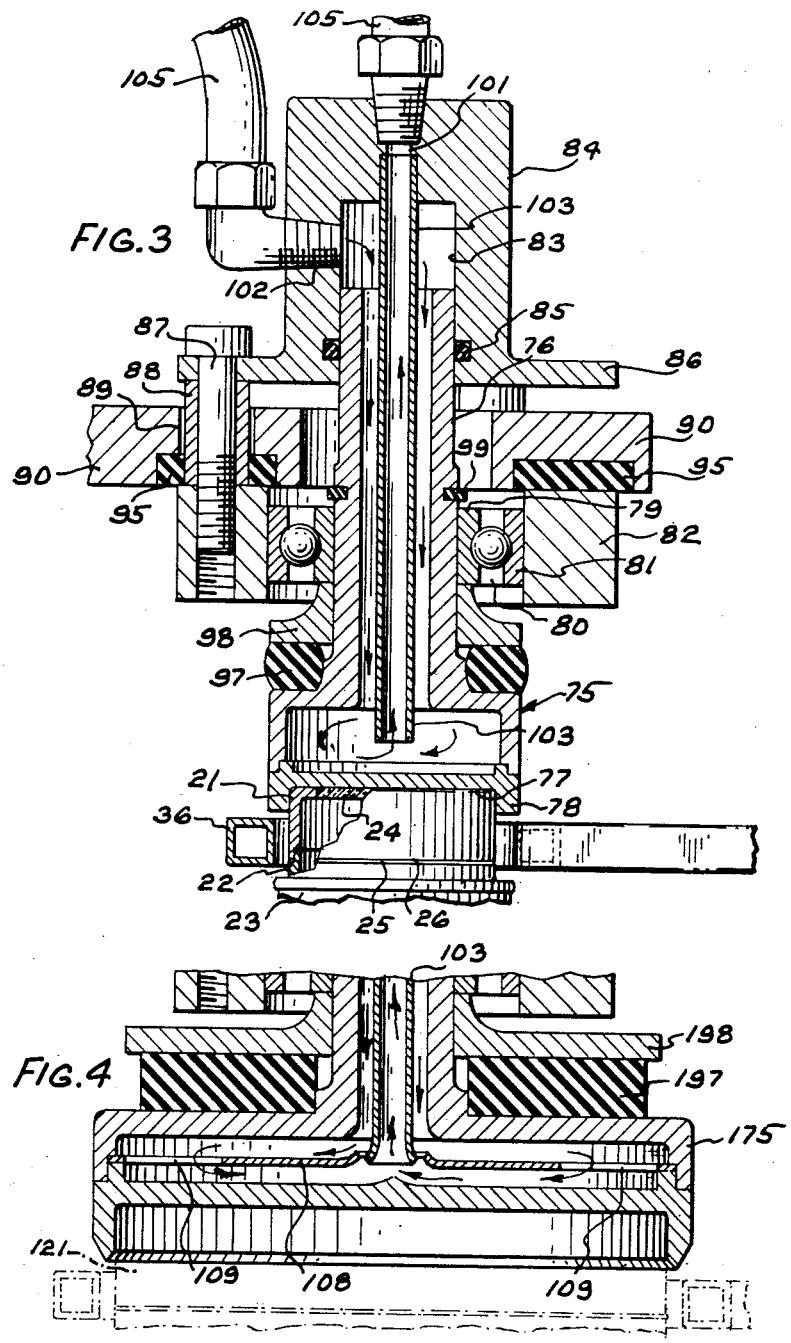

United States Patent Office 2,768,595
Patented Oct. 30, 1956

2,768,595

ROTATABLE DEVICE FOR COOLING A PART DURING A BRAZING OPERATION

Theodore W. Kalbow, Chicago, and Lester O. Reichelt, Naperville, Ill., assignors to Western Electric Company, Incorporated, New York, N. Y., a corporation of New York Application June 4, 1953, Serial No. 359,585

8 Claims. (Cl. 113—98)

This invention relates to a device for cooling a part while it is being brazed to a member and more particularly to a rotatable device for cooling a part while it is being rotated with and brazed to an article.

It is an object of the present invention to provide a device for effectively cooling a part while it is being brazed to an article.

It is a further object of the invention to provide an improved rotatable device for cooling a part while it is being rotated with and brazed to an article.

In accordance with one embodiment of the invention as applied to the cooling of a part as it is being brazed to a vacuum tube of the type known as a magnetron, wherein the magnetron, with the part thereon, is mounted for rotation about a vertical axis and is raised to a predetermined elevation to position the part and a portion of the magnetron within a stationary high frequency heating coil, there is provided a rotatable hollow head with a hollow stem which is connected to a non-rotatable fitting having conduits connected to means for circulating a coolant through the head to cool it, and the hollow head and fitting are mounted in a stationary support for limited lateral movement to permit the flat recessed lower end of the head to seat on the part and be aligned with the axis of rotation of the magnetron. The hollow head is mounted for limited axial movement relative to the support and a resilient member urges it into tight engagement with the part of the magnetron during the brazing operation.

Other objects and advantages of the invention will become apparent by reference to the following detailed description and the accompanying drawings illustrating a preferred embodiment thereof, in which—

Fig. 3 is a fragmentary vertical sectional view through the cooling device; and

Fig. 4 is a fragmentary vertical sectional view of a modified form of construction of the head of said cooling device.

Figure 1:
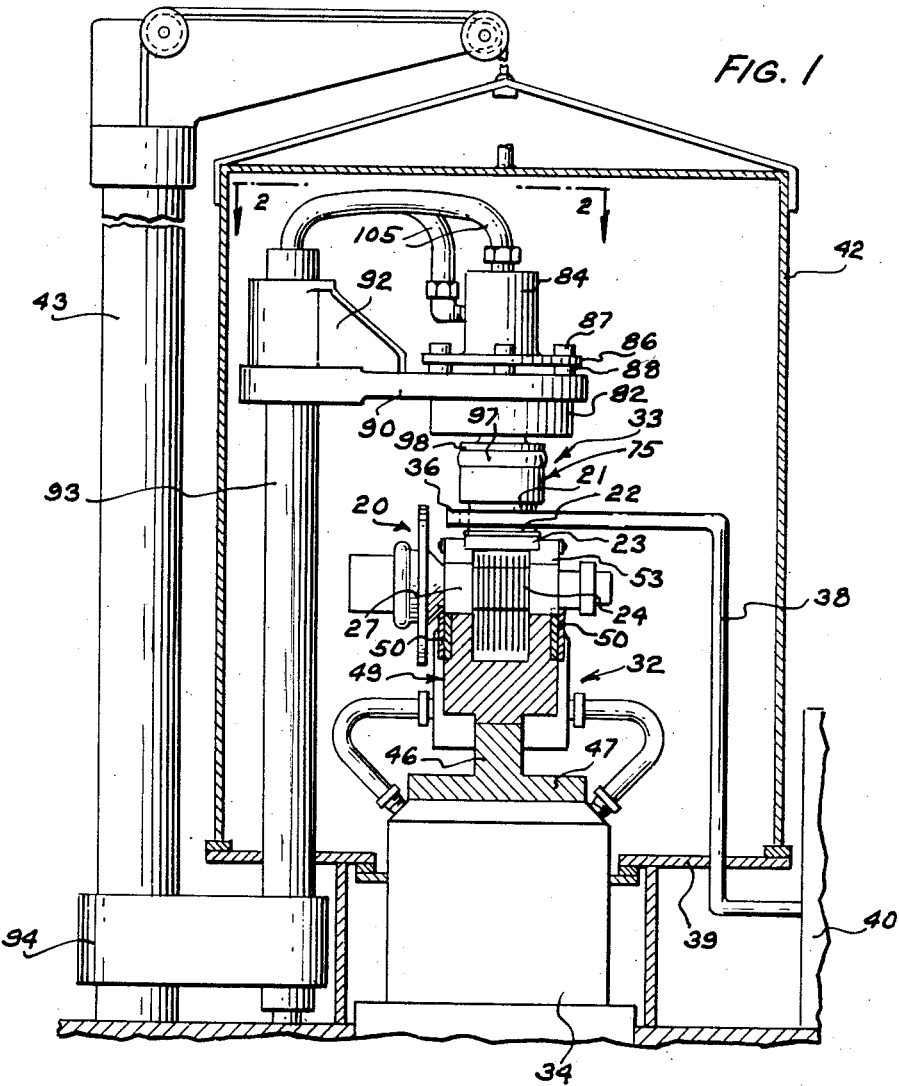
Fig. 1 is a vertical sectional elevational view of an apparatus for brazing a cap to a magnetron and showing the cooling device for cooling the cap during the brazing operation.
Figure 2:
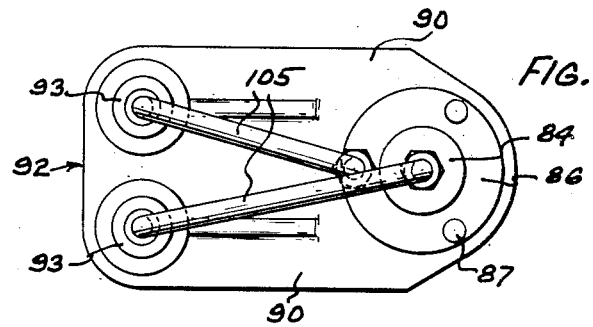
Fig. 2 is a plan view of the cooling device shown in Fig. 1, as indicated by lines 2—2 of Fig. 1.

The present apparatus is designed for cooling portions of a magnetron 20 during the brazing of a cap 21 to an annular wall 22, which extends upwardly from a cylindrical portion 23 of the magnetron. The cap 21 has a glass window 24 bonded thereto in an opening in the end wall thereof. A ring 25 of brazing material is placed between the rabbetted interfitting ends of the cap 21 and the annular wall 22, which ends may then be placed within a high frequency induction heating coil and heated to effect a bonded juncture 26 between the parts.

It is essential, during the brazing operation, that portions of the cap 21 and the magnetron, in closely spaced relation to the juncture 26, be cooled to prevent damage to the window and the bonded juncture between the window 24 and cap 21, and other bonded junctures between the various components of the magnetron. For this purpose, a fixture 32 is provided for supporting the magnetron and cooling the portions thereof below the juncture 26 and an upper fixture 33 is provided for cooling the upper portion of the cap 21.

The fixture 32 is fixed to the upper end of a piston 34, which is vertically reciprocable for raising the fixture 32 and the magnetron thereon from a lower loading position to a predetermined operative position with the parts 21 and 22 disposed within a stationary annular high frequency heating coil 36 and with the cap 21 in engagement with the upper cooling fixture 33. The piston 34 is adapted to be rotated to turn the fixture 32 and the magnetron during the brazing operation. The coil 36 is connected to and supported by conductors 38 which extend through a stationary annular platform 39 and are connected to a high frequency current generating device 40. A counter-balanced glass hood 42, adjustably supported from the upper end of a standard 43, is adapted to be lowered over the brazing apparatus in engagement with the platform 39 to form a chamber to contain an atmosphere of brazing process gas supplied thereto, in which the brazing operation may be performed.

The fixture 32 comprises a support 46 formed integral with a base plate 47, which is secured to the piston 34. A holder 49 is secured to the support 46 and has a pair of recessed members 50 forming seats for receiving the rectangular pole pieces 27 therein to support the magnetron in a predetermined position with the parts 21 and 22 thereof disposed uppermost. A pair of cooling blocks 53 are pivotally mounted on the support 46 on opposite sides of the holder 49 for movement into engagement with portions of the magnetron for cooling portions thereof.

The cooling fixture 32 is more fully disclosed and claimed in a co-pending application of T. W. Kalbow and L. O. Reichelt, Serial No. 359,584, filed June 4, 1953.

The fixture 33 comprises a rotary hollow cooling head 75 having a hollow stem 76 extending upwardly therefrom. The head 75 has a lower flat surface 77 and a peripheral flange 78 engageable with the upper flat surface and the peripheral surface, respectively, of the cap 21. The stem 76 is slidably mounted in the inner race 79 of a ball bearing 80, the outer race 81 of which is secured in a mounting ring 82. The upper end of the stem extends into a bore 83 of a non-rotatable fitting 84 and into engagement with the lower portion of the cylindrical wall thereof and a packing 85 forms a seal between the rotary stem 76 and the stationary fitting. The fitting 84 has a peripheral flange 86 provided with apertures therein and bolts 87 pass through the apertures and through spacing sleeves 88 and threadedly engage threaded apertures in the mounting ring 82 to secure the fitting 84 and mounting ring 82 in fixed and spaced relation to each other. The sleeves 88 pass through apertures 89 in a stationary plate 90 of a supporting bracket 92 fixed to the upper end of a pair of tubular posts 93, the lower ends of which extend through the platform 39 and are connected to the standard 43 by a bracket 94. The spacing sleeves 88 are longer than the thickness of the plate 90 to permit a predetermined vertical movement of the fitting 84 and the rotary cooling ring 75 relative to the plate 90, and the diameter of the apertures 89 in the plate 90 are larger than the diameter of the sleeves 88 to permit a limited lateral movement of the head 75 and thus provide a floating mounting therefor and allow the head 75 to seat on and align itself coaxially with the cap 21.

An annular rubber member 95 seated in a groove in the lower side of the plate 90 has apertures therein for receiving the spacing sleeves 88 therein and serves to yieldably maintain the fitting 84 and the head 75 in a predetermined position with the axes thereof aligned with the axis of the parts 21 and 22 of the magnetron. The head 75 is urged downwardly by a compressible resilient rubber ring 97 interposed between a shoulder formed on the upper end wall of the head 75 and a collar 98 mounted on the stem in engagement with the inner race of the ball bearing 80. A split ring 99 on the stem forms a stop engageable with the inner race 79 for limiting the downward movement of the head. As the ring 25 of brazing material, which is placed between the parts 21 and 22, becomes heated and fuses during the brazing of the cap 21 to the annular part 22, the rubber ring 97 will yieldably force the head 75 and the cap 21 downwardly against the part 22 to effect a tight engagement therebetween.

A centrally disposed port 101 is formed in the upper end of the fitting 84 and a port 102 is formed in the lateral wall portion thereof. A pipe 103 is fixed in the upper end of the fitting 84 and extends downwardly from the port 101 within the hollow stem 76 and in spaced relation to the inner walls thereof and the lower end of the pipe 103 terminates in the hollow head 75 in spaced relation to the lower wall thereof. Flexible conduits 105 are connected to the ports 101 and 102 of the fitting 84 and extend downwardly through the hollow posts 93 and are connected to means for circulating through the head. The coolant flows into the fitting 84 through port 102 and downwardly into the hollow head, then upwardly through the pipe 103 and out of the fitting through the port 101, and serves to cool the head 75, which, in turn, serves to cool the upper portion of the cap 21.

In a modified form of construction shown in Fig. 4 the hollow cooling head 175 is of larger diameter for use in cooling a cap 121 of a magnetron of a larger size while the cap is being brazed onto the magnetron. The lower end of the stationary pipe 103 fits into a central opening of a disc 108 secured in the head substantially midway between the upper and lower walls of the chamber formed therein. Apertures 109 formed in the marginal portions of the disc permit free circulation of the coolant from the upper to the lower portions of the chamber.

The remainder of the elements of the modified structure shown in Fig. 4 is substantially the same as that shown in Fig. 3 except that the rubber ring 197 and the collar 198, corresponding to the elements 97 and 98, respectively, are increased in diameter to conform to the enlarged diameter of the head 175. With this construction the coolant is circulated to the outer periphery of the head in the upper portion of the chamber formed therein and radially inwardly to the center thereof in the lower portion of the chamber, thus insuring the effective cooling of the entire lower surface of the head 175 and the top portion of the cap 21 when the head is positioned in contact therewith.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A fixture for cooling a part while it is being rotated and brazed to an article comprising a rotatable hollow cooling head having a surface conforming to and engageable with a portion of said part, a fitting having ports connectible to means for supplying coolant thereto, means for supporting said fitting against rotation and for supporting said head for rotation, means interconnecting the head and the fitting to provide passageways for the circulation of coolant into and out of the hollow head, rotatable article supporting means coaxially aligned with said head, means for rotating said article supporting means, and means for effecting relative axial movement between said head and said article supporting means.

2. A fixture for cooling a part while it is being rotated and brazed to an article comprising a rotatable work holder for supporting an article, means for rotating said work holder, a rotatable hollow cooling head coaxially aligned with said work holder and having a surface conforming to and engageable with a portion of said part, a fitting having ports connectible to means for supplying coolant thereto, mounting means for supporting said fitting against rotation and for supporting said head for rotation and for limited axial movement relative to said fitting, means interconnecting the head and the fitting to provide passageways for the circulation of coolant into and out of the hollow head, means for effecting relative axial movement between said cooling head and said work holder, and resilient means for urging said head axially toward said work holder to yieldably maintain said head against said part.

3. A fixture for cooling a part while the part is being rotated and brazed to an article, comprising a rotatable work holder for supporting an article, means for rotating said work holder, a rotatable hollow cooling head coaxially aligned with said work holder and having a surface conforming to and engageable with a portion of said part, a fitting having ports connectible to means for supplying coolant thereto, mounting means interconnecting said head and said fitting for supporting said head for rotary and limited axial movement relative to said fitting, means extending between the rotatable hollow head and the fitting and providing passageways for the passage of coolant from said fitting into and out of the hollow head to cool said head, stationary means including a resilient element engageable with said mounting means for supporting said fitting against rotation and for supporting the head and fitting for limited lateral movement, and resilient means urging said head for axial movement toward said work holder to yieldably maintain the head against the part.

4. A fixture for cooling a part while it is being rotated about a predetermined axis and brazed to another part, comprising a rotatable work holder for supporting said parts, means for rotating said work holder, a rotatable hollow cooling head having a hollow stem extending therefrom, said head having a surface conforming to and engageable with a portion of said part being brazed, a fitting having a bore for rotatably receiving one end of said hollow stem, mounting means fixed to said fitting for supporting said head for rotation and for limited axial movement relative to said fitting, means for yieldably supporting said mounting means in a normal position with the head coaxially aligned with said work holder and for limited radial movement, resilient means engageable with said head for stressing said head for axial movement toward said work holder to yieldably maintain said head against said part, means for limiting the axial movement of said head relative to said mounting means, said fitting having a pair of ports connectible to means for supplying coolant to the fitting, and means on said fitting for directing coolant supplied thereto into and out of said head.

5. A fixture for cooling a part while said part is being rotated about a predetermined axis and brazed to an article, comprising a rotatable work holder for supporting said article, means for rotating said work holder, a rotatable hollow cooling head having a hollow stem extending therefrom, said head having a face thereof conforming to and engageable with a portion of said part being brazed, a fitting having a bore for receiving one end of said hollow stem therein, mounting means on said fitting for supporting said head for rotation and for limited axial movement relative to said fitting, means including a resilient member engageable with said mounting means for supporting it and said head in a predetermined normal position with the head in coaxial alignment with said work support and for limited lateral movement, resilient means engageable with said head for stressing said head for axial movement in one direction toward said work holder for maintaining said head against said part, means for limiting the extent of axial movement of the head, a tube mounted in said fitting in spaced relation to the walls of the bore therein and in spaced relation to the inner walls of the hollow stem and with one end thereof disposed in said hollow head and in spaced relation to the walls of said head, a first port in said fitting communicating with the other end of said tube, a second port in said fitting communicating with said bore therein, and conduit means connected to said bores and connectible to means for supplying coolant to said fitting for circulation into and out of said hollow head.

6. A fixture for cooling a part while said part is being rotated and brazed to an article comprising a rotatable work holder for supporting an article, means for rotating said work holder, a rotatable hollow cooling head coaxially aligned with said rotatable work holder and having a pair of end walls and continuous side walls, one of said end walls having a surface conforming to and engageable with a portion of the part to be brazed and the other wall having a central aperture and a central hollow stem extending therefrom, a disc in said hollow head disposed between the end walls thereof and having a central opening and marginal openings therein, a fitting having a bore therein for receiving the end portion of said stem and having a pair of ports connectible to means for supplying coolant thereto, means for supporting said fitting against rotation and for rotatably supporting said head with the stem thereof in the bore in said fitting, and a pipe in said fitting extending axially thereof through the hollow stem and into the central aperture in said disc and connected to one of said ports, the parts being arranged to form passageways in the fitting and the stem for directing coolant into and out of said hollow head and toward and from the center and marginal portions of opposite ends of said head.

7. A fixture for cooling a part while the part is being rotated and brazed to an article, comprising a rotatable work holder for supporting an article, means for rotating said work holder, a rotatable hollow cooling head coaxially aligned with said work holder and having a hollow stem extending therefrom, said head having a shallow recess in one face thereof conforming to and engageable with a portion of the part being brazed, a fitting having a cylindrical bore for receiving one end of the hollow stem therein, a mounting ring having means engageable with the stem for rotatably supporting the hollow head, a plurality of connector elements for supporting the fitting and the mounting ring in fixed and spaced relation to each other, a supporting plate interposed between the fitting and the mounting ring and having apertures therein providing clearance for the connector elements and the stem, a resilient member connected to said supporting plate and interposed between said ring and the plate to support the fitting against rotation and to allow for limited axial movement of the mounting ring and parts connected thereto and supported thereby, said fitting having ports connectible to means for supplying coolant thereto, and means in said fitting extending into the stem of said head for directing said coolant into and out of said head.

8. A fixture for cooling a part while the part is being rotated and brazed to an article comprising a rotatable work holder for supporting an article, means for rotating said work holder, a rotatable hollow cooling head having a hollow stem extending therefrom, said head having a shallow recess in one face thereof conforming to and engageable with a portion of the part being brazed, a fitting having a bore for receiving one end of the hollow stem therein, a mounting ring having means engageable with the stem for rotatably supporting the hollow head, a plurality of connector elements for supporting the fitting and the mounting ring in fixed and spaced relation to each other, a stationary supporting plate interposed between the fitting and the mounting ring and having clearance apertures therein for the connector elements and the stem, a resilient member mounted on said supporting plate engageable with said connector elements for supporting them and the cooling head in a predetermined normal position with the head coaxially aligned with said work holder and permitting lateral movement of said head, said fitting having ports connectible to means for supplying coolant thereto, and means in said fitting extending into the stem of said head for directing said coolant into and out of said head.

References Cited in the file of this patent
UNITED STATES PATENTS

| | | |
|---|---|---|
| 1,778,628 | Eckman | Oct. 14, 1930 |
| 2,015,415 | Steiner | Sept. 24, 1935 |
| 2,396,956 | Larson | Mar. 19, 1946 |